(12) United States Patent
Eisenbarth et al.

(10) Patent No.: US 7,308,014 B2
(45) Date of Patent: Dec. 11, 2007

(54) LASER

(75) Inventors: Udo Eisenbarth, Rodermark (DE); Joachim Jonuscheit, Gro Zimmern (DE)

(73) Assignee: ELS Elektronik Laser System GmbH (DE)

( * ) Notice: Subject to any disclaimer, the term of this patent is extended or adjusted under 35 U.S.C. 154(b) by 569 days.

(21) Appl. No.: 10/919,794

(22) Filed: Aug. 17, 2004

(65) Prior Publication Data
US 2005/0041718 A1 Feb. 24, 2005

(30) Foreign Application Priority Data
Aug. 18, 2003 (DE) .............................. 103 38 417

(51) Int. Cl.
*H01S 3/083* (2006.01)
(52) U.S. Cl. .............................. 372/94; 372/67; 372/70
(58) Field of Classification Search ................... 372/94, 372/67, 70
See application file for complete search history.

(56) References Cited

U.S. PATENT DOCUMENTS

| 5,206,868 | A | 4/1993 | Deacon |
| 5,856,996 | A | 1/1999 | Durkin et al. |
| 6,577,666 | B2 * | 6/2003 | Erhard et al. ................. 372/70 |
| 6,834,064 | B1 * | 12/2004 | Paschotta et al. ............. 372/30 |
| 2002/0172253 | A1 | 11/2002 | Vetrovec |

FOREIGN PATENT DOCUMENTS

| DE | 19722943 A1 | 12/1998 |
| DE | 10054289 A1 | 2/2002 |

OTHER PUBLICATIONS

The 2003 Photonics Circle of Excellence Award Winners, Elektronik Laser System GmbH, VersaDisk-515 Yb:Yag Laser, in: Photonics Spectra, Jan 2004, pp. 64, 65 and 69.

* cited by examiner

*Primary Examiner*—Dung T. Nguyen
(74) *Attorney, Agent, or Firm*—Young Basile

(57) ABSTRACT

The present invention relates to a laser including a laser amplifier and a laser resonator. The laser amplifier includes a disk-shaped active medium having a reflector. The active medium rests on a cooling means for cooling said active medium and said reflector. The reflector embodies a mirror of said laser resonator. The laser amplifier includes an optical means for refocusing a pumping light configured for repeatedly deviating said pumping light and refocusing said pumping light onto the active medium for causing a multiple passage of said pumping light through said active medium. Such a thin-disk laser is not prone to thermal lensing. According to the invention, the laser resonator is formed as a ring resonator. Two optical waves can travel around within the ring resonator in different directions. An optical selection means is provided for giving preference to propagation of one of the both optical waves traveling around that can be coupled out as an output laser beam. The laser according to the invention is highly stable and can be adjusted and tuned easily. Intra-cavity frequency-multiplication can be achieved easily.

20 Claims, 6 Drawing Sheets

LASER

CROSS-REFERENCE TO RELATED APPLICATIONS

This application is related to, and claims the benefit of priority from, German Patent Application Serial No. 103 38 417.0, filed Aug. 18, 2003.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

BACKGROUND OF THE INVENTION

FIG. 1 shows such a solid-state laser according to the prior art, which is distributed by the applicant under the name "VersaDisk". The laser 100 comprises a laser amplifier 2 and a linear laser resonator 101. The laser amplifier 2 comprises a disk-shaped active medium 3 having a reflector, which is either deposited onto a back surface of the active medium 3 as a highly reflective coating, or which is formed as a separate mirror and connected with the active medium 3. The active medium 3 with the reflector rests on a cooling means 4 formed as a cooling finger, which cooling means dissipates heat from the active medium substantially perpendicular to a surface thereof.

The linear laser resonator 101 is formed by the above reflector and the concave mirror 11 serving as an output mirror for coupling out the output laser beam 19. Within the laser resonator 101 are provided an etalon 14, a Brewster plate 15 or selectively a Lyot filter 16 for enabling a selection of the wavelength, polarization and mode within the laser resonator 101. The active medium 3 is disposed at the focus of a parabolic or concave mirror 7 serving as an optical means for refocusing a pumping light. The pumping light is imaged via the glass fiber 5 and an input coupling mirror 6 disposed at a side thereof onto a mirror segment of the concave mirror 7, which images the pumping light onto the active medium 3 and focuses it. Pumping light 9b that is reflected by the reflector of the active medium 3, is reflected back onto another location or another segment of the concave mirror 7, where the pumping light is deviated onto another location or another segment of the concave mirror 7 and imaged and focused again onto the active medium 3. Thus, the pumping light is deviated repeatedly by the concave mirror 7 and is focused again onto the active medium 3 so that a multiple beam passage of the pumping light through the active medium 3 is accomplished. Thus, the effective absorption length within the active medium can be substantially larger than the thickness of the active medium 3. With regard to further details of the pumping geometry reference is made to U.S. Pat. No. 6,577,666 B2 and US 2003/25987 A1, the contents of which are hereby explicitly incorporated in the present application. A standing optical wave is formed within the laser resonator 101, which propagates through the opening 8 of the concave mirror 7.

The laser according to FIG. 1 is characterized by a high pump efficiency. Due to the homogeneous heat flow within the cooling finger 4, which serves at a heat sink, which heat flow is substantially co-linear to the optical axis of the laser resonator 101, thermal lensing effects are practically neglectible. The output laser beam 19 exhibits a nearly perfect Gaussian-shaped beam profile at all power levels so that the output laser beam 19 can be focused to small beam spots. Using a Yb:YAG crystal as the active medium 3, output powers of 10 W to 100 W at an output wavelength of 1030 nm can be achieved. The Lyot filter 16 provides for the ability of tuning the wavelength between approximately 1000 nm and approximately 1060 nm. The etalon 14 provides for a longitudinal single mode operation. The laser according to FIG. 1 can be operated in a perfect $TEM_{00}$ laser operation.

However, with the laser according to FIG. 1, a stability range, where laser oscillation can be maintained reliably, is relatively narrow. In particular, the laser resonator 101 is relatively prone to tilting of both end mirrors of the linear laser resonator relative to each other. Furthermore, adjusting the laser for a stable laser operation is relatively critical with regard to the locations and angular positions of the optical elements of the laser resonator. Furthermore, disposing a frequency-multiplying crystal within a standing wave resonator according to FIG. 1 is relatively complicated, as the conditions for frequency multiplication are highly sensitive to instabilities of the linear standing wave resonator.

US 2002/0172253 A1 discloses a solid-state laser comprising a plurality of thin-disk laser amplification modules in a so-called active mirror configuration, each comprising an amplification medium, a cooling means for cooling the amplification medium and a mount for the amplification medium. A coolant flows through the cooling means. Use of an optical means for refocusing a pumping light is not disclosed. This laser is intended for very high output laser powers, but is not suitable for tuning an output wavelength. Although use of a ring resonator is disclosed, wherein a plurality of amplification modules are disposed, such a ring resonator is instable. For suppressing higher TEM laser modes, a beam extension telescope comprising two concave mirrors, is provided; an opening is disposed at a focus thereof.

DE 100 54 289 A1 discloses a solid-state laser comprising a laser amplifier disposed outside of the laser resonator. An output beam of the solid-state laser enters the external laser amplifier via an opening of a parabolic mirror, said external laser amplifier being formed by a crystal disk that is mounted on a cooling finger and is optically pumped by a pumping light beam. The pumping light beam is repeatedly imaged onto the crystal disk by the parabolic mirror in order to increase the pump efficiency of the external laser amplifier.

U.S. Pat. No. 6,577,666 B2 discloses a laser amplification system comprising a solid-state laser and a pumping light source, a pumping light beam thereof repeatedly passing through the amplification medium of the solid-state laser by means of an optical means for refocusing the pumping light. The solid-state body rests with the rear flat side on a reflector, which itself is seated on a front end of a cooling finger. A mirror disposed below an opening of the optical means for refocusing forms an end mirror of a linear laser resonator. Due to its similar configuration this laser is subject to comparable limitations, which have been discussed previously with reference to FIG. 1.

U.S. Pat. No. 5,856,996 discloses an end-pumped laser system having a linear resonator or a double z-shaped resonator.

DE 197 22 943 A1 discloses a non-planar ring laser.

U.S. Pat. No. 5,206,868 discloses a resonant non-linear laser beam converter. Furthermore, various resonator geometries are disclosed.

SUMMARY OF THE DISCLOSURE

According to a first aspect of the present invention, there is to be provided a laser having a disk-shaped active medium enabling a stable long-term operation and enabling an easy adjustment and tuning of the laser. According to a further aspect of the present invention, frequency multiplication is to be accomplished in a simple manner with such a laser.

A laser according to the present invention comprises a laser amplifier and a laser resonator, said laser amplifier having a disk-shaped active medium with a reflector, said active medium being seated on a cooling means for cooling the active medium and said reflector, wherein the reflector constitutes or embodies an end mirror of the laser resonator. The laser according to the present invention is characterized in that the laser resonator is formed as a ring resonator, in which two optical waves traveling around in different directions can propagate, wherein an optical selection means is provided for giving preference to one of the two optical waves traveling around, which one optical wave can be coupled out as an output laser beam.

The present invention relies on the surprising finding that the laser resonator can, nevertheless, be implemented as a ring resonator despite the configuration of the laser amplifier with a substantially axial dissipation of heat from the active medium, which usually requires a relatively complicated pumping geometry. Such a ring resonator exhibits a relatively broad range of stability and is particularly robust against relative tilting or de-adjusting of the mirrors of the ring resonator, so that the ring resonator can be adjusted in a relatively simple manner. As is known, ring resonators exhibit at least two beam waists so that according to the present invention a beam waist, having a higher intensity, can be used as well for a frequency multiplication of the basic wavelength of the laser within the laser resonator (intra-cavity frequency multiplication).

According to the present invention the ring resonator is configured such that two optical waves can travel around in the ring resonator in different directions. An optical selecting means, e.g. an optical diode disposed within the ring resonator, enables giving preference to the propagation of one of the both optical waves traveling around while suppressing accordingly the propagation of the other one of the both optical waves traveling around, so that said one of the both optical waves traveling around can be coupled out as the output laser beam. As no optical standing wave is formed within the ring resonator, spatial hole burning within the active medium can be avoided. Therefore, the laser according to the present invention is characterized by an advantageously high pump efficiency. At the same time the laser enables an operation at a single longitudinal laser mode (single-frequency operation). Thus, according to the present invention those advantages that can be achieved with a laser having a disk-shaped active medium that rests on a cooling finger for dissipating heat in a substantially axial direction can also be achieved with a ring resonator. In particular, a practically nearly Gaussian-shaped beam profile, the capability of changing the pumping power without reduction of the beam characteristics and the single-mode operation described above can be accomplished easily.

Preferably, the active medium is a doped solid-state laser crystal, in particular a host crystal doped with rare-earth ions, which is optically pumped. The active medium comprises a reflector, which is preferably put onto a rear side of the active medium as a highly reflective coating, or which is formed as a mirror, which is either formed separately or connected with the active medium. The reflector can also be formed as a planar mirror or also as a concave mirror, which is arched in a concave manner, that forms together with the output mirror (which is disposed opposite to the reflector and which is preferably also arched concavely) a resonator portion of the ring resonator.

According to a further embodiment, the cooling means is formed as a cooling finger of a material, which conducts heat well, for serving as a heat sink of a pumping laser power dissipated within the active medium. At an end of the cooling finger opposite to the active medium there is provided a cooling means for cooling the active medium and the reflector by dissipating heat substantially perpendicular to the surface of the active medium. According to another embodiment the cooling means comprises a thermoelectric cooling element, e.g. a Peltier element.

As described above, the disk-shaped active medium with the reflector, which rests on a cooling means for cooling the laser-active medium and the reflector, requires a relatively complicated pumping geometry for coupling a pumping light beam into the active medium in such a manner that a laser beam irradiated from the active medium is not adversely affected by elements of the pumping geometry used. According to another preferred embodiment, an optical means for refocusing the pumping light is provided, which is configured for repeatedly deviating a pumping light and refocusing it onto the active medium for causing a multiple beam passage of the pumping light through the active medium and for multiplying the effective absorption length within the active medium. Preferably the pumping light, which is deviated and refocused into the active medium, propagates through the active medium in a substantially co-linear manner and under a relatively small angle to the laser beam in the corresponding resonator portion of the ring resonator.

According to another preferred embodiment, the optical means for refocusing the pumping light comprises a parabolic mirror, which images or focuses the pumping light, said active medium being disposed at a focus or at a focal plane thereof. Preferably, the pumping light is axially offset against the laser beam in the corresponding resonator portion of the ring resonator and is coupled into the parabolic mirror under an acute angle to the laser beam. In principle, the pumping light can be irradiated directly onto the parabolic mirror. Preferably, the pumping light is guided towards the laser via a glass fiber and is coupled into the parabolic mirror therefrom via a coupling mirror, which is disposed at a side of the active medium.

Suitably, the parabolic mirror is configured as a concave mirror, which surrounds the active medium substantially as a half-space, wherein the active medium is disposed at the focus or focal plane of the concave mirror. The concave mirror can be formed integrally. According to another preferred embodiment, the concave mirror comprises a plurality of mirror segments disposed diametrically opposite to each other, wherein a beam deviating means, e.g. a pair of prisms, is respectively assigned to said mirror segments for deviating the pumping light after a passage through the active medium onto another mirror segment, from where the pumping light is imaged and refocused onto the active medium in a manner, which is described e.g. in U.S. Pat. No. 6,577,666 B2 or US 2003/25987 A1.

According to another preferred embodiment, the parabolic or concave mirror comprises an opening at a central portion so that said one of the both optical waves traveling around within the laser resonator propagates therethrough. The position and width of the opening of the concave mirror are configured such that the optical wave, which travels around within the ring resonator, can pass through the opening unaffected. The standing wave is reflected by the reflector of the active medium under a preferably acute angle, wherein the width of the opening of the concave mirror, which is disposed at a given distance to the surface of the active medium, substantially corresponds to at least twice the length, of a circular arc corresponding to the reflection angle.

According to another preferred embodiment, the ring resonator is configured as a ring resonator folded in a z-shaped manner, which comprises two resonator portions that preferably extend parallel to each other, wherein beam paths of the optical wave traveling around within the ring resonator intersect each other. It is an advantage, that beam propagation within the ring resonator can be computed by means of the known ABCD matrix formalism in a simple manner so that the laser beam within the ring resonator after one revolution is imaged again onto itself. Ring resonators that are folded in a z-shaped manner are characterized by a relatively broad range of stability and are particularly robust against tilting of the mirrors of the ring resonator so that such a ring resonator can be adjusted easily.

One of the two resonator portions of the ring resonator is formed by two concave mirrors disposed opposite to each other, wherein a beam waist is formed between both concave mirrors, as is well known. The position and diameter of the beam waist in the corresponding resonator portion can be determined by selecting the distance between the both concave mirrors and the curvature radii, as is well known. By focusing, high intensities can be achieved in the area of the beam waist, which can be used for an efficient frequency multiplication within the ring resonator. For this purpose, preferably a frequency multiplying crystal is arranged in the area of the beam waist. In this embodiment the reflector of the active medium and/or the mirrors forming the laser resonator are provided with a highly reflective coating at the fundamental wavelength of the active medium and at a frequency-multiplied harmonic of this fundamental wavelength. Thus, an optical wave at the fundamental wavelength travels around in the ring resonator, and thus the frequency-doubled or frequency-multiplied optical wave is coupled out of the ring resonator by the output mirror in accordance with the reflectivity of the output-coupling mirror.

Output coupling can be accomplished by means of one of the two concave mirrors that form the beam waist for frequency multiplication. According to another preferred embodiment the fundamental wavelength and the harmonic of the fundamental wavelength are coupled out of the ring resonator at different mirrors. More preferably, the fundamental wavelength is coupled out at one of the two concave mirrors disposed adjacent to the beam waist while the harmonic of the fundamental wavelength is coupled out at a deviating mirror disposed opposite to the reflector of the active medium. Even more preferably, the ring resonator is folded in a z-shaped manner such that two output laser beams are irradiated or coupled out at the concave mirror and at the end mirror in a substantially parallel manner and offset to each other.

According to another aspect of the present invention there is provided a laser comprising a laser amplifier and a laser resonator, said laser amplifier comprising a disk-shaped active medium having a reflector, said active medium resting on a cooling means for cooling the active medium and the reflector, said reflector embodying or constituting a mirror of the laser resonator, wherein said laser resonator is formed as a stable ring resonator, wherein two optical waves traveling around in said ring resonator are capable of propagating into different directions, wherein an optical selection means is provided for giving preference to propagation of one of the both optical waves traveling around, which can be coupled out as the output laser beam. As the ring resonator is a stable laser resonator, an advantageously stable disk laser can be implemented. Furthermore, such a laser can be adjusted and tuned in an advantageously simple manner.

According to another aspect of the present invention there is provided a laser comprising a laser amplifier and a laser resonator, said laser amplifier comprising a disk-shaped active medium having a reflector, said active medium resting on a cooling means for cooling said active medium and said reflector, said reflector embodying or constituting a mirror of said laser resonator, wherein said laser resonator is formed as a ring resonator, two optical waves traveling around within said laser resonator being capable of propagating into different or opposite directions, wherein an optical selection means is provided for giving preference to propagation of one of the both optical waves traveling around, which can be coupled out as an output laser beam; wherein an optical means for refocusing a pumping light is disposed within said ring resonator and/or near said active medium, said optical means being configured for repeatedly deviating a pumping light and refocusing said pumping light onto the active medium for affecting a multiple beam passage of the pumping light through the active medium. The optical means for refocusing the pumping light is arranged such that at least said one of the both optical waves traveling around within said ring resonator is not obstructed. Preferably, the ring resonator is a stable ring resonator. In such a manner a very compact configuration can be provided for a laser having a high output power. Such a laser is characterized by a broad range of stability and can be adjusted and tuned easily and reliably.

BRIEF DESCRIPTION OF THE DRAWINGS

In the following preferred embodiments according to the present invention will be described with reference to the accompanying drawings, from which further features, advantages and objects can be concluded by the person skilled in the art, wherein.

WRITTEN DESCRIPTION

Figure 1:
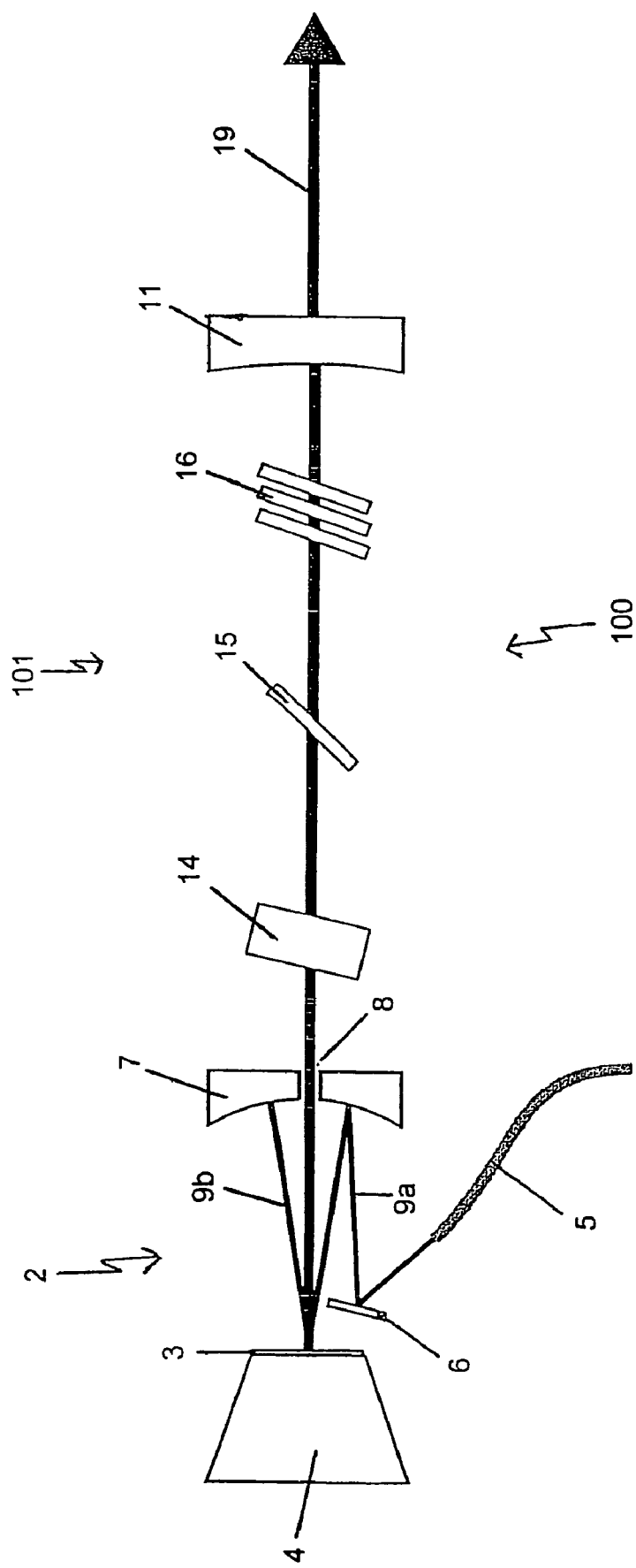
FIG. 1 shows a block diagram of a laser having a linear laser resonator according to the prior art.

Throughout the drawings identical reference numerals relate to identical or substantially equally effective elements or groups of elements.

Figure 2:
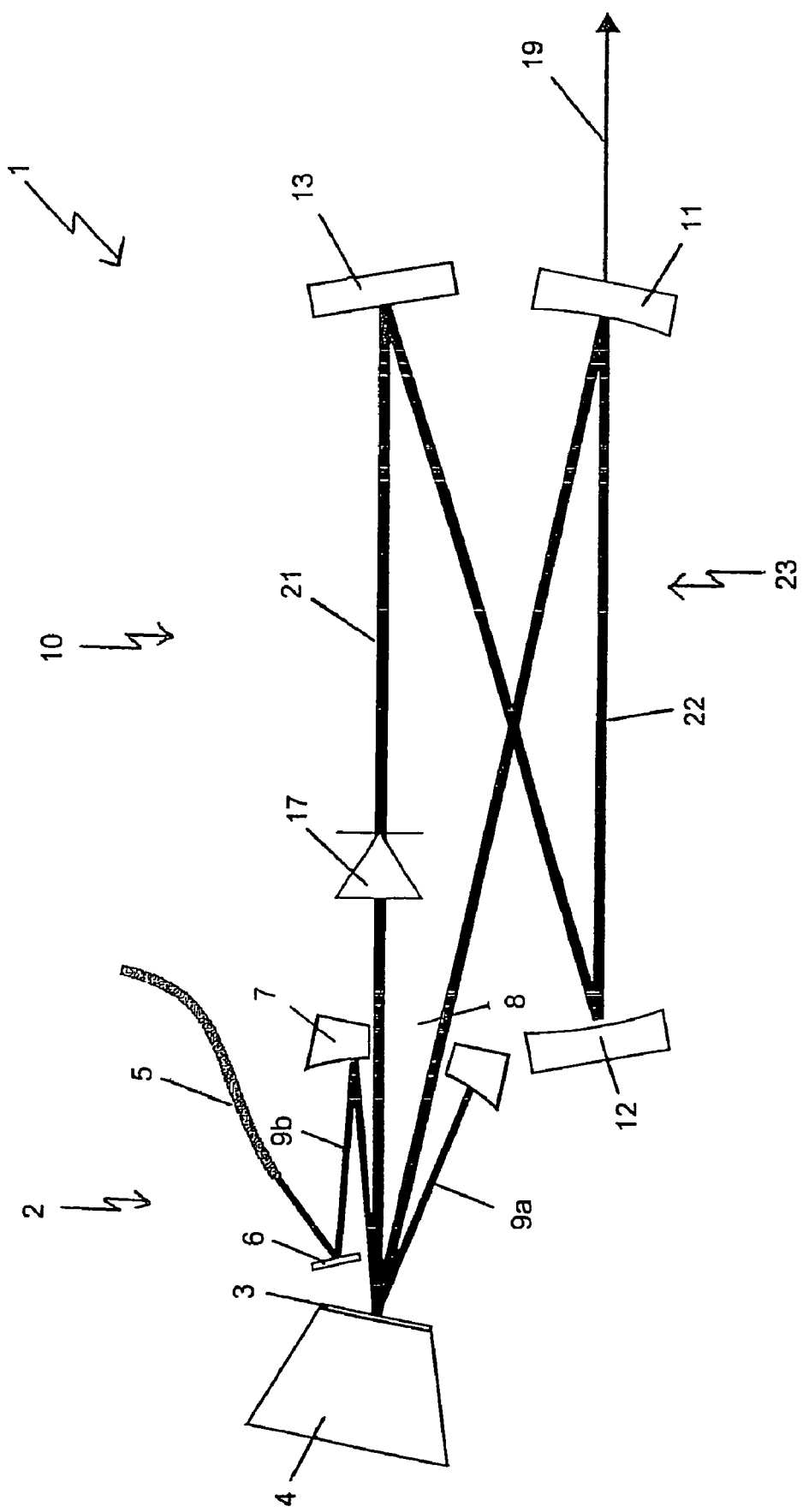
FIG. 2 shows a block diagram of a laser according to a first embodiment of the present invention.

FIG. 2 shows a schematic diagram of a laser having a ring resonator according to a first embodiment of the present invention. Referring to FIG. 2, the laser 1 comprises a laser amplifier 2 and a ring resonator 10. The laser amplifier 2 is formed by the active medium 3 with the reflector (not shown), which rest on a cooling finger 4, and by the parabolic or concave mirror 7 in a manner as described with reference to FIG. 1 above. The parabolic or concave mirror 7 repeatedly deviates and refocuses a pumping light onto the active medium 3, which pumping light is irradiated from the glass fiber 5 and coupled in via the input coupling mirror 6 disposed at a side of the active medium 3. In FIG. 2 only two pumping light beam paths 9a, 9b are shown schematically, although a 24-fold passage of the pumping light through the active medium 3 is achieved by means of the concave mirror 7 and deviating means (not shown), e.g. deviating prisms. As shown in FIG. 2, the concave mirror 7, which serves as an optical means for refocusing the pumping light, is disposed in proximity to the active medium 3 and within the ring resonator 10.

As shown in FIG. 2, the active medium 3 with the reflector form a partial portion of the ring resonator 10, which is substantially folded in a z-shaped manner. The ring resonator 10 comprises the first resonator portion 21 between the reflector of the active medium 3 and the planar deviating mirror 13 as well as the second resonator portion 22 between the two concave mirrors 11, 12 that are disposed opposite to each other and are arched concavely. A beam waist 23 is formed between the two concave mirrors 11, 12, as is known to a person skilled in the art. As shown in FIG. 2, the resonator portions 21, 22 extend substantially parallel to each other. Laser light reflected by the concave mirror 11 is again imaged onto the active medium 3 and the reflector. An optical diode 17, which serves as an optical selection means and is disposed within the first resonator portion 21, suppresses propagation of an optical wave traveling around within the ring resonator 10 counterclockwise and gives preference to propagation of an optical wave traveling around within the ring resonator 10 clockwise. The concave mirror 11, which serves as an output-coupling mirror, is partially transmissive at the fundamental wavelength of the laser amplifier 2 for coupling out the output laser beam 19.

As shown in FIG. 2, an acute angle is enclosed between the light beam reflected by the concave mirror 11 onto the active medium 3 and the first resonator portion 21. The active medium 3 with the reflector and the concave mirror 7 are tilted to each other by half the acute angle relative against the first resonator portion 21. For providing an astigmatism as small as possible the angle, which is enclosed by the light beam reflected by the concave mirror 11 onto the active medium 3 and by the first resonator portion 21 is chosen as to be small, e.g. within a range between approximately 2° and approximately 10°.

As shown in FIG. 2, the width of the opening 8 formed in the concave mirror 7 is at least twice the width of the length of a circular arc defined by a corresponding folding of the ring resonator 10 in the area of the concave mirror 7. Thus, diffractive losses of the laser wave traveling around within the ring resonator 10 through the opening 8 can be avoided.

As no optical standing wave is formed within the ring resonator 10, spatial hole burning in the active medium 3 can be suppressed efficiently. The ring resonator 10 is characterized by a broad range of stability so that the laser 1 can be adjusted easily and is comparatively robust against tilting of the mirrors 11 to 13 forming the ring resonator 10 and of the reflector (not shown) of the active medium 3. The ring resonator 10 is also robust against thermal expansion. For reducing thermal expansion, optical elements defining the ring resonator 10, in particular the mirrors 11 to 13 and the active medium 3 with the reflector, can be mounted on a block of a material having an extremely low coefficient of thermal expansion, e.g. Invar. A length stabilization of the ring resonator 10 is generally not required but can be provided, e.g. by mounting the concave mirror 11 on a mirror support having a piezoelectric actuator that can be shifted axially in the length direction of the second resonator portion 22.

Figure 3:
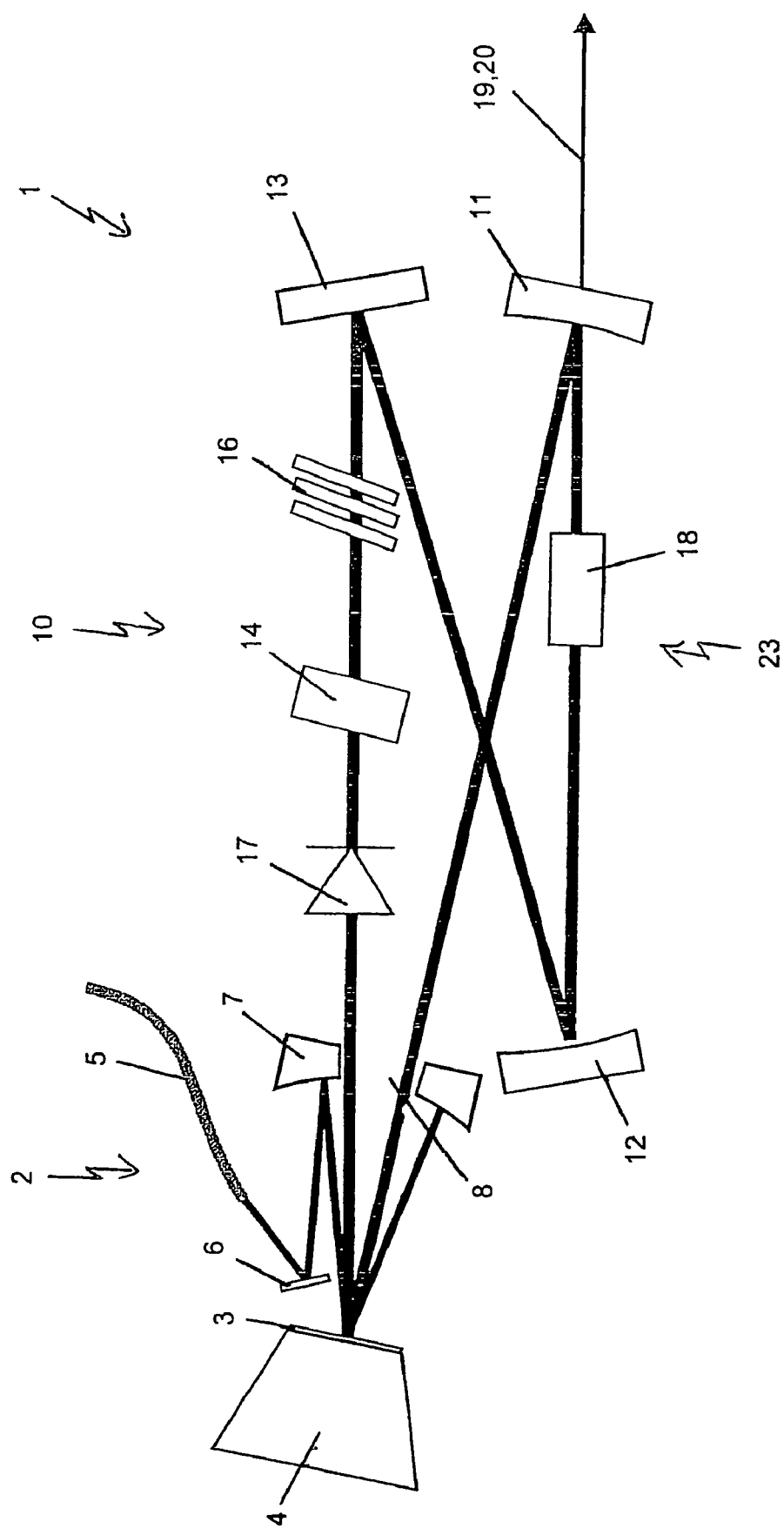
FIG. 3 shows a block diagram of a laser according to a second embodiment of the present invention.

For selecting the wavelength and mode, further optical elements can be disposed within the ring resonator 10. This is shown e.g. in FIG. 3, which shows a laser according to a second embodiment according to the present invention. According to FIG. 3, an etalon 14 for selecting one of the longitudinal modes of the ring resonator 10 within the spectral range of amplification of the active medium 3 and a tunable Lyot filter 16 for tuning the laser wavelength of the laser 1 are disposed in the first resonator portion 21. In the area of the beam waist 23 in the second resonator portion 22 there is disposed a frequency-multiplying crystal 18. For phase-matching the fundamental wavelength of the ring resonator 10 and the harmonic of the fundamental wavelength, in particular the second harmonic, the crystal is heated to a suitable temperature by controlling a temperature thereof. Of course, phase-matching can also be accomplished by cooling the crystal 18 or varying an angle thereof.

The ratio of the power coupled out at the fundamental wavelength to the power at the harmonic of the fundamental wavelength is defined by the reflectivity of the concave mirror 11 serving as an output-coupling mirror and can be varied by varying the reflectivity of the concave mirror 11 at the fundamental wavelength and at the harmonic of the fundamental wavelength. As an example, two output laser beams 19, 20 at the fundamental wavelength and at the harmonic of the fundamental wavelength can be coupled out by means of the concave mirror 11 in a co-linear manner. However, if the reflectivity of the concave mirror 11 at the fundamental wavelength is chosen as to be very high, virtually no laser light is coupled out at the fundamental wavelength but only light at the harmonic of the fundamental wavelength is coupled out.

For adjusting the ring resonator 10 in a simpler manner, the reflector of the active medium 3 and the mirrors 11 to 13 can also be highly reflective at the harmonic of the fundamental wavelength. Although an optical diode 17 is disposed in the ring resonator 10, it is preferred that the optical elements 17, 14, 16 and 18 within the ring resonator 10 have an anti-reflection coating at the fundamental wavelength. An anti-reflection coating of the optical element 17, 14, 16 and 18 can also be provided at the harmonic of the fundamental wavelength.

Figure 4:
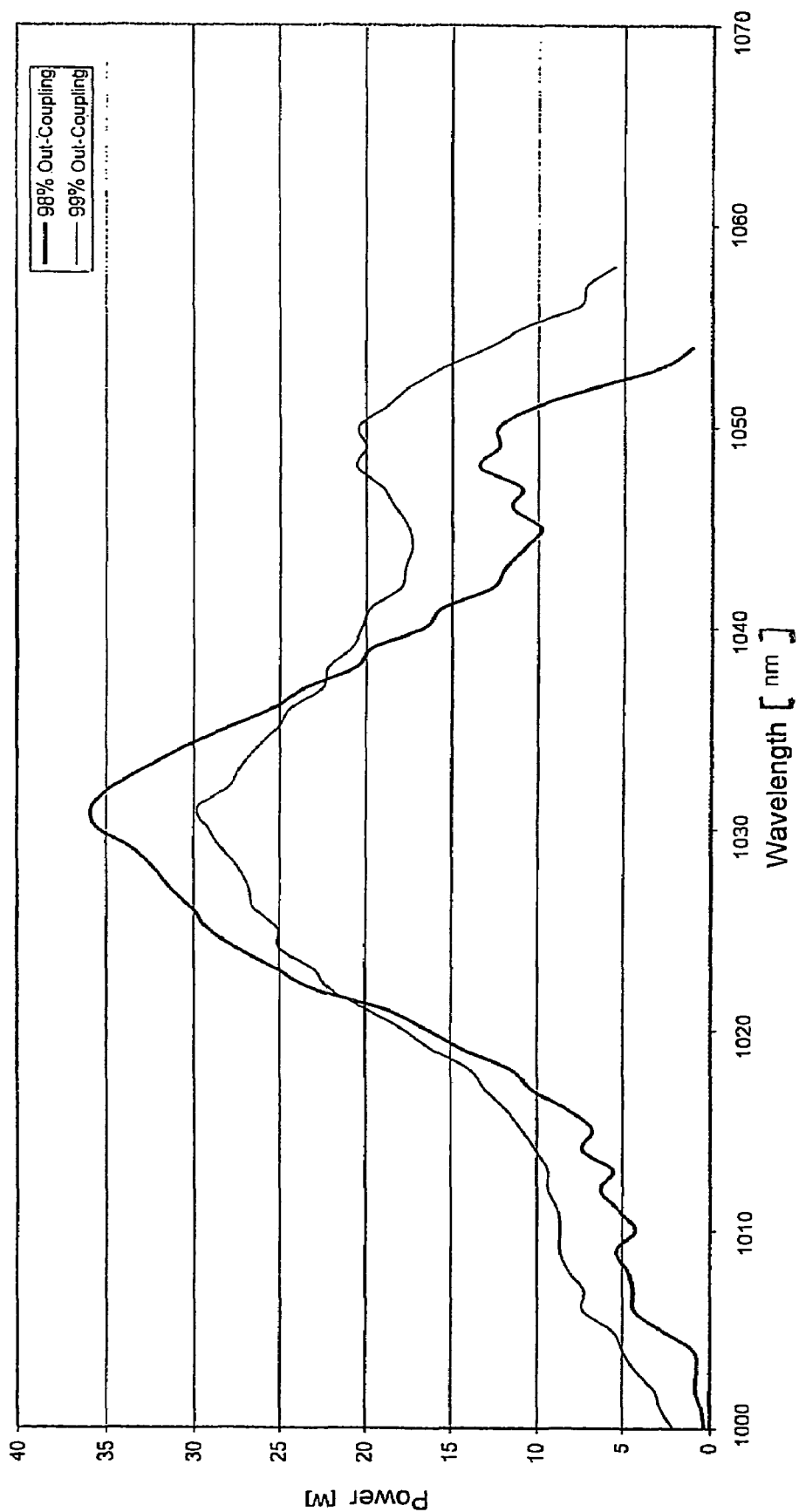
FIG. 4 shows a tuning plot at a fundamental wavelength of a laser according to the present invention.

FIG. 4 schematically shows the tuning plot of a laser according to the present invention. An Yb:YAG crystal is used as an active medium having an optimum laser efficiency at an output wavelength of approximately 1030 nm. The laser was pumped by pumping light at a power of approximately 140 W, at a pumping wavelength of approximately 940 nm and at a focal length of the concave mirror 7 of approximately 32.5 mm for accomplishing an output power of 50 W at an output wavelength of approximately 1030 nm. FIG. 4 shows that the laser according to the present invention can be tuned over a wavelength range of approximately 60 nm centered at the central wavelength of approximately 1030 nm.

Figure 5:
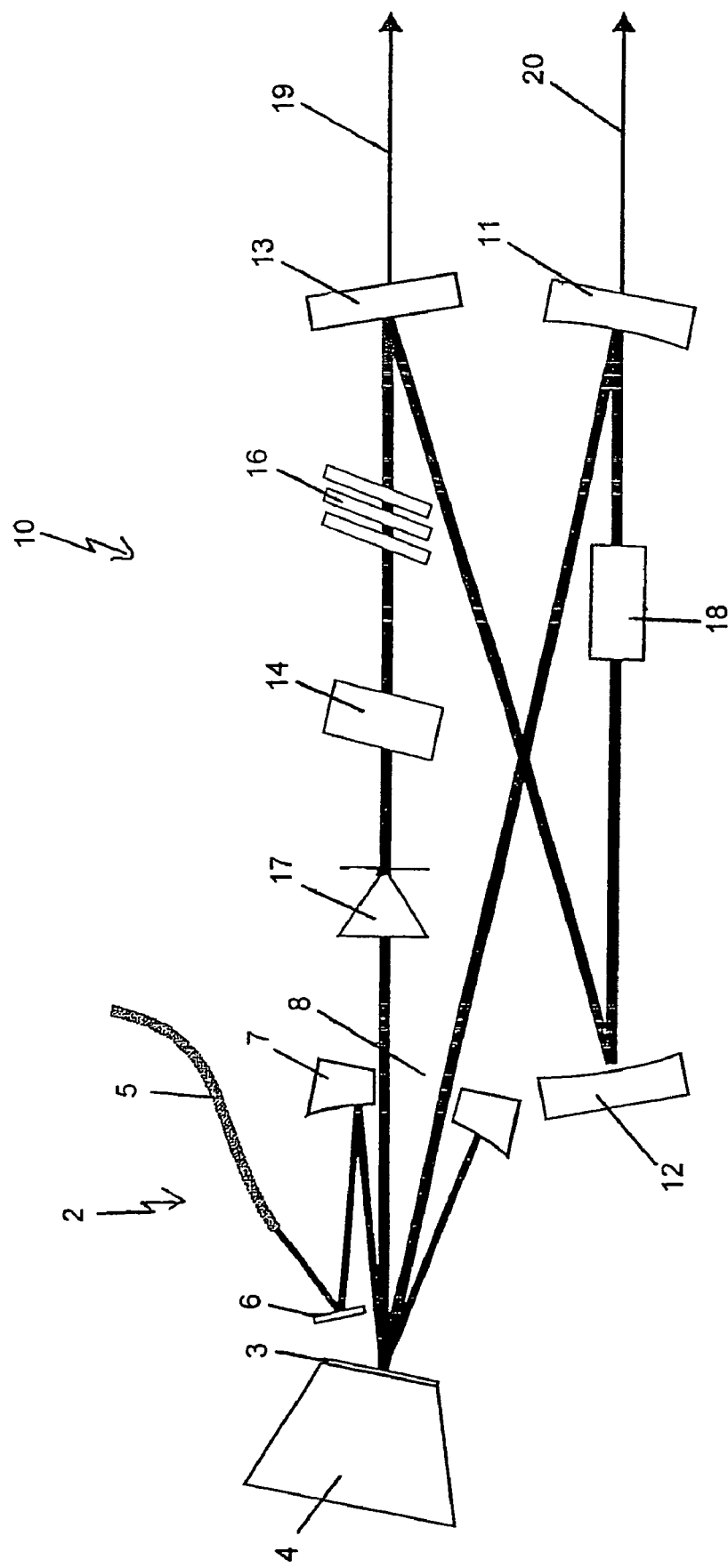
FIG. 5 shows a block diagram of a laser according to a third embodiment of the present invention.

FIG. 5 shows a schematic block diagram of a laser according to a third embodiment of the present invention. Referring to FIG. 5, the end mirror 13 for the first resonator portion 21 serves as an output-coupling mirror for the fundamental wavelength and the concave mirror 11 of the second resonator portion 22 serves as an output-coupling mirror for the harmonic of the fundamental wavelength, in particular for the second harmonic of the fundamental wavelength in the range of approximately 515 nm when using an Yb:YAG crystal. As shown in FIG. 5, the ring resonator 10 is folded so that the both output laser beams 19, 20 are irradiated from the laser 1 offset in a substantially parallel manner to each other. This simplifies adjusting the laser 1 in operation.

Figure 6:
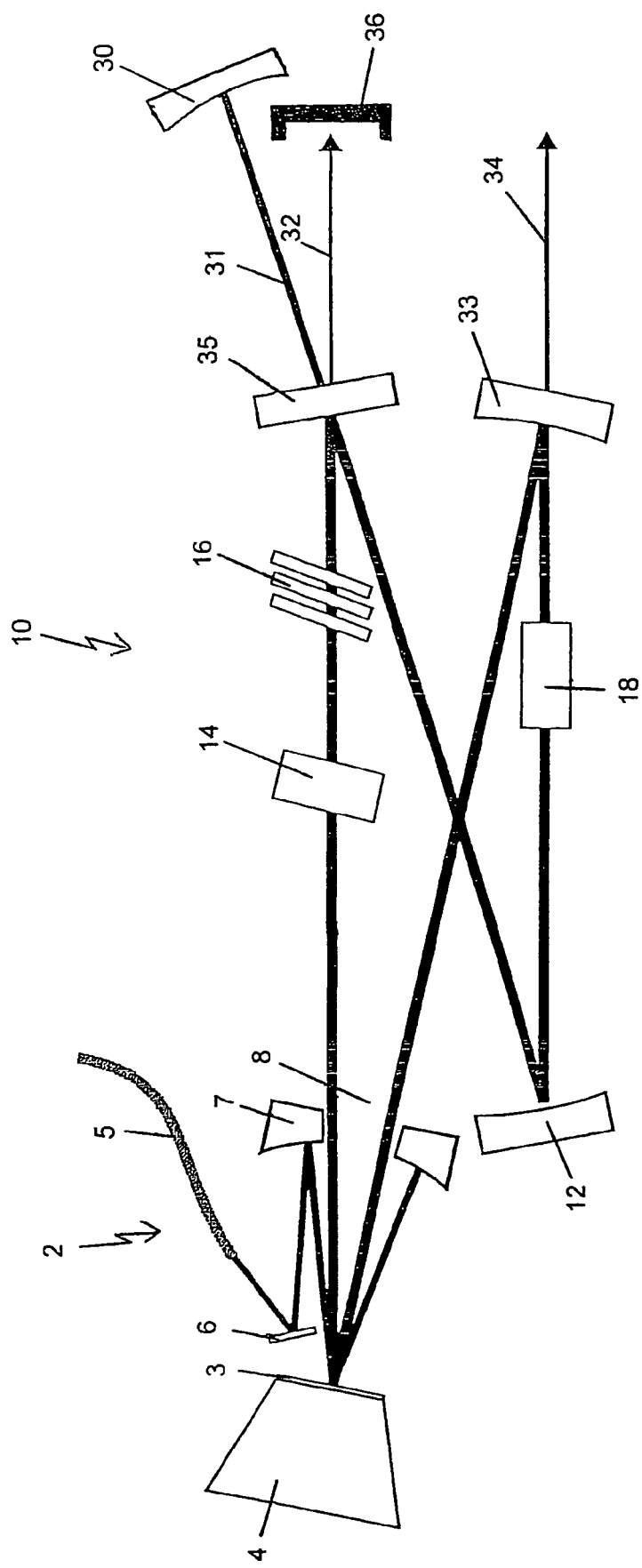
FIG. 6 shows a block diagram of a laser according to a fourth embodiment of the present invention.

FIG. 6 shows a schematic block diagram of a laser according to a fourth embodiment of the present invention. Referring to FIG. 6, the ring resonator 10 is formed by the active medium 3, the mirror 35 and the two concave mirrors 12 and 33 forming the second resonator portion. The concave mirror 33 serves as an output-coupling mirror. Referring to FIG. 6, instead of an optical diode (compare FIG. 5; reference numeral 17; e.g. in form of a Faraday rotator) a concave mirror 30 disposed outside of the ring resonator 10 serves as an optical selection means for selecting one of the both optical waves traveling around in the ring resonator 10. According to FIG. 6 the concave mirror 30 is disposed on a thought extension line of the optical axis, which is defined by the concave mirror 12 and the mirror 35. When laser oscillation of the laser 10 according to FIG. 6 starts, two traveling directions of the laser radiation inside the ring resonator 10 will result at first. The optical wave irradiated from the active medium 3 in a horizontal direction has the desired traveling direction. In contrast, the other or opposite traveling direction runs from the active medium 3 via the mirror 33 and the concave mirror 12 towards the mirror 35. As the mirror 35 has a transmissivity of approximately 1–2%, the optical wave traveling around in the undesired traveling direction impinges onto the concave mirror 30 disposed outside of the resonator, from where it is reflected, and reenters the ring resonator 10 in an opposite direction. The power of this beam that is reflected back by the concave mirror 30 adds to the power of the optical wave traveling around in the desired traveling direction so that only one optical wave traveling around in the desired traveling direction will result in the stationary laser operation. The output laser beam 34 is coupled out of the ring resonator 10 by means of the output-coupling mirror 33. A residual radiation 32 transmitted by the mirror 35 in the horizontal direction can be blocked by a beam trap 36. The laser shown in FIG. 6 can be operated selectively with a frequency-doubling crystal 18, e.g. a LBO crystal, or without a frequency-doubling crystal.

Although it has been described above that the active medium 3 is an Yb:YAG crystal, it will become apparent to a person skilled in the art when studying the above description that any other solid-state laser material will be suitable for use in a laser according to the present invention as well, e.g. Nd:YAG. The geometry of the resonator folded substantially in a z-shaped manner with two resonator portions extension extending substantially parallel to each other, can be extended by further resonator portions.

Preferred laser parameters can be summarized in an exemplary manner as follows: The active medium is formed as a thin disk or laser crystal having a diameter of approximately 10 mm and a thickness of approximately 240 µm, and can be put onto a cooling finger, a temperature of which is controlled at a predetermined value with a maximum temperature variation of approximately 0.1° C. Such a pumping geometry is characterized by a neglectable proneness to thermal lensing, because heat is dissipated homogeneously and co-linear to the optical axis, i.e. substantially perpendicular to the surface of the active medium. As a result the laser beam, which is coupled out, shows a nearly perfect Gaussian shape with an $M^2$ value of approximately 1.0 to approximately 1.1, irrespective of the pumping power actually used. Therefore, the output laser beam can be focused onto beams spots of a small diameter.

For a Yb:YAG crystal using an optical etalon and a Lyot filter that are disposed within the ring resonator, tuneability of the output wavelength within a band of more than 60 nm centered at the central wavelength of 1030 nm can be achieved at a single-mode operation of the laser. Output laser powers in the range between approximately 10 W and approximately 100 W could be achieved at a perfect Gaussian shaped beam profile. The laser could be operated in a $TEM_{00}$ operation. The radius of curvature of the concave mirror 12 was e.g. 200 mm, the radius of curvature of the concave mirror 11 was e.g. 200 mm. Preferably, the both concave mirrors 11, 12 were disposed at a distance of approximately 210 mm to each other. The length of the first resonator portion 21 was approximately 400 mm, the aperture between the beam reflected by the concave mirror 11 of the active medium 3 and the first resonator portion 21 was preferably approximately 12°.

Although not described above, it will become apparent to a person skilled in the art that the laser according to the present invention is also suitable for a pulse of or quasi-continuous laser operation, e.g. by providing Q-switching or an acoustic-optic or electro-optic modulator for active mode-coupling within the ring resonator 10.

As will become apparent from the above description, various modifications of the laser according to the present invention can be made without departing from the spirit of the present invention and the extent of protection of the claims. Accordingly, such modifications shall be comprised by the present invention.

The present application claims convention priority of German patent application No. 103 38 417.0-54, filed Aug. 18, 2003, with the title "Laser, having a laser amplification system with a disk-shaped active medium", the whole content of which is hereby explicitly incorporated in the present application for the purpose of disclosure.

The invention in which an exclusive property or privilege is claimed is defined as follows:

1. A laser comprising a laser amplifier and a laser resonator, wherein:
    said laser amplifier comprises a disk-shaped active medium having a reflector;
    said active medium rests on a cooling means for cooling said active medium and said reflector;
    said reflector embodies a mirror of said laser resonator; and
    said laser amplifier comprises an optical means for refocusing a pumping light, said optical means being configured for repeatedly deviating said pumping light and refocusing said pumping light onto the active medium for causing a multiple passage of said pumping light through said active medium;
    wherein said laser resonator is formed as a ring resonator, two optical waves traveling around therein in different directions, and
    wherein an optical selection means is provided for giving preference to propagation of one of said both optical waves traveling around, said one optical wave being coupled out as an output laser beam.

2. The laser of claim 1, wherein said optical means for refocusing said pumping light comprises a parabolic mirror focusing said pumping light.

3. The laser of claim 2, wherein said parabolic mirror comprises a plurality of mirror segments, said parabolic mirror comprising an opening through which said one of said both optical waves traveling around in said laser resonator propagates.

4. The laser of claim 1, wherein said reflector is formed by an anti-reflection coating deposited onto a rear side of the active medium.

5. The laser of claim 1, wherein said cooling means is a cooling finger for dissipating heat substantially perpendicular to a surface of said active medium.

6. The laser of claim 1, wherein said optical selection means is an optical diode.

7. The laser of claim 1, wherein said laser resonator is a ring resonator folded in a z-shaped manner, said ring resonator comprising a first and a second resonator portion, wherein paths of said one optical wave traveling around intersect each other between said first and second resonator portions.

8. The laser of claim 7, wherein said first resonator portion is formed by said active medium with the reflector and by a deviating mirror.

9. The laser of claim 8, wherein one of an optical selection means, a wavelength selection means and a mode selection means for selecting a longitudinal mode of said laser resonator is selectively disposed within said first resonator portion.

10. The laser of claim 8, wherein said second resonator portion is formed by two concave mirrors disposed opposite to each other, a second beam waist being formed therebetween.

11. The laser of claim 10, wherein a frequency-multiplying crystal is disposed in an area of said second beam waist.

12. The laser of claim 11, wherein one of said reflector and said mirrors forming said laser resonator are provided with a highly reflective coating at a fundamental wavelength and a frequency-multiplied harmonic of said fundamental wavelength.

13. The laser of claim 10, wherein one of said both concave mirrors forming said second resonator portion is configured as an output-coupling mirror for coupling out an output laser beam at a fundamental wavelength.

14. The laser of claim 8, wherein said deviating mirror forming said first resonator portion is configured as an output-coupling mirror for coupling out an output laser beam at a harmonic of said fundamental wavelength.

15. The laser of claim 14, wherein said second resonator portion is formed by two concave mirrors disposed opposite to each other, a second beam waist being formed therebetween, wherein said selection means is formed by a concave mirror disposed outside of said laser resonator and disposed on a thought extension line of an optical axis defined between one of the both concave mirrors forming said second resonator portion and said output-coupling mirror.

16. The laser of claim 15, wherein a transmissivity of said output-coupling mirror is in the range between 1% and 2%.

17. The laser of claim 7, wherein said laser resonator is folded such that the two output laser beams are irradiated in a manner substantially offset parallel to each other.

18. The laser of claim 1, wherein said laser resonator is actively mode-coupled for outputting laser pulses.

19. A laser, comprising a laser amplifier and a laser resonator, wherein:
   said laser amplifier comprises a disk-shaped active medium having a reflector;
   said active medium rests on a cooling means for cooling said active medium and said reflector;
   said reflector embodies a mirror of said laser resonator; and
   said laser resonator is formed as a stable ring resonator, two optical waves traveling around in different directions within said ring resonator; wherein
   an optical selection means is provided for giving preference to propagation of one of said both optical waves traveling around, said one optical wave being coupled out as an output laser beam.

20. A laser, comprising a laser amplifier and a laser resonator, wherein:
   said laser amplifier comprises a disk-shaped active medium having a reflector;
   said active medium rests on a cooling means for cooling said active medium and said reflector;
   said reflector embodies a mirror of said laser resonator;
   said laser resonator is formed as a ring resonator, two optical waves traveling around in different directions within said ring resonator; and
   an optical selection means is provided for giving preference to propagation of one of said both optical waves traveling around, said one optical wave being coupled out as an output laser beam; wherein
   an optical means for refocusing a pumping light is disposed within said ring resonator and near said active medium, said optical means being configured for repeatedly deviating said pumping light and for refocusing said pumping light onto said active medium for causing a multiple passage of said pumping light through said active medium.

* * * * *